US008069461B2

(12) United States Patent
Angiolillo et al.

(10) Patent No.: US 8,069,461 B2
(45) Date of Patent: Nov. 29, 2011

(54) ON-SCREEN PROGRAM GUIDE WITH INTERACTIVE PROGRAMMING RECOMMENDATIONS

(75) Inventors: Joel Angiolillo, Western, MA (US); Jordan Kanarek, Brookline, MA (US)

(73) Assignee: Verizon Services Corp., Ashburn, VA (US)

( * ) Notice: Subject to any disclaimer, the term of this patent is extended or adjusted under 35 U.S.C. 154(b) by 464 days.

(21) Appl. No.: 11/392,784

(22) Filed: Mar. 30, 2006

(65) Prior Publication Data

US 2007/0250861 A1   Oct. 25, 2007

(51) Int. Cl.
    *H04N 5/445* (2006.01)
(52) U.S. Cl. .............. 725/46; 725/40; 725/47; 725/51
(58) Field of Classification Search ............... 725/39–51
    See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,158,155 A | 10/1992 | Domain et al. |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,442,390 A | 8/1995 | Hooper et al. |
| 5,473,362 A | 12/1995 | Fitzgerald et al. |
| 5,479,266 A | 12/1995 | Young et al. |
| 5,479,268 A | 12/1995 | Young et al. |
| 5,499,103 A | 3/1996 | Mankovitz |
| 5,510,811 A | 4/1996 | Tobey et al. |
| 5,512,963 A | 4/1996 | Mankovitz |
| 5,515,173 A | 5/1996 | Mankovitz et al. |
| 5,517,257 A | 5/1996 | Dunn et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,585,838 A | 12/1996 | Lawler et al. |
| 5,600,368 A | 2/1997 | Matthews |
| 5,600,711 A | 2/1997 | Yuen |
| 5,616,876 A | 4/1997 | Cluts |
| 5,619,274 A | 4/1997 | Roop et al. |

(Continued)

OTHER PUBLICATIONS

Parent-approved, fun for kids; TiVo.com/KidZone; Accessed Mar. 2006; 1 page; Applicant makes no admission that this reference constitutes prior art. http://www.tivo.com/1.2.17.asp.

(Continued)

*Primary Examiner* — Scott Beliveau
*Assistant Examiner* — Nicholas T Corbo

(57) ABSTRACT

A subscriber to a video service generally has available to them an on-screen program guide. The program guide lists programming (e.g., TV shows) that are available to the subscriber for a certain upcoming time period. The programming guide may sort the listings by channel and time, areas of interest, age appropriateness and/or MPAA or TV rating, free or additional cost, etc. In an embodiment, the programming guide includes an ability to make a selection to see which TV shows are recommended by reviewers. Such reviewers may be individuals or panels or institutions to which some credibility may be attached—a trusted source. After selecting a reviewer, the subscriber is made aware of the programs recommended by the selected reviewer.

33 Claims, 9 Drawing Sheets

U.S. PATENT DOCUMENTS

| | | | |
|---|---|---|---|
| 5,623,613 A | 4/1997 | Rowe et al. | |
| 5,630,119 A | 5/1997 | Aristides et al. | |
| 5,640,484 A | 6/1997 | Mankovitz | |
| 5,648,824 A | 7/1997 | Dunn et al. | |
| 5,654,748 A | 8/1997 | Matthews | |
| 5,657,072 A | 8/1997 | Aristides et al. | |
| 5,673,401 A | 9/1997 | Volk et al. | |
| 5,677,708 A | 10/1997 | Matthews et al. | |
| 5,678,012 A | 10/1997 | Kimmich et al. | |
| 5,682,511 A | 10/1997 | Sposato et al. | |
| 5,684,525 A | 11/1997 | Klosterman | |
| 5,687,331 A | 11/1997 | Volk et al. | |
| 5,689,663 A | 11/1997 | Williams | |
| 5,699,107 A | 12/1997 | Lawler et al. | |
| 5,701,383 A | 12/1997 | Russo et al. | |
| 5,706,145 A | 1/1998 | Hindman et al. | |
| 5,721,829 A | 2/1998 | Dunn et al. | |
| 5,724,492 A | 3/1998 | Matthews et al. | |
| 5,727,060 A | 3/1998 | Young | |
| 5,731,844 A | 3/1998 | Rauch et al. | |
| 5,734,786 A | 3/1998 | Mankovitz | |
| 5,734,823 A | 3/1998 | Saigh et al. | |
| 5,734,891 A | 3/1998 | Saigh | |
| 5,745,095 A | 4/1998 | Parchem et al. | |
| 5,745,713 A | 4/1998 | Ferguson et al. | |
| 5,751,282 A | 5/1998 | Girard et al. | |
| 5,752,160 A | 5/1998 | Dunn | |
| 5,757,417 A | 5/1998 | Aras et al. | |
| 5,758,258 A | 5/1998 | Shoff et al. | |
| 5,758,259 A | 5/1998 | Lawler | |
| 5,774,172 A | 6/1998 | Kapell et al. | |
| 5,781,228 A | 7/1998 | Sposato | |
| 5,790,115 A | 8/1998 | Pleyer et al. | |
| 5,790,198 A | 8/1998 | Roop et al. | |
| 5,790,935 A | 8/1998 | Payton | |
| 5,793,973 A | 8/1998 | Birdwell et al. | |
| 5,801,787 A | 9/1998 | Schein et al. | |
| 5,805,165 A | 9/1998 | Thorne et al. | |
| 5,805,763 A | 9/1998 | Lawler et al. | |
| 5,808,608 A | 9/1998 | Young et al. | |
| 5,809,204 A | 9/1998 | Young et al. | |
| 5,812,123 A | 9/1998 | Rowe et al. | |
| 5,812,205 A | 9/1998 | Milnes et al. | |
| 5,815,145 A | 9/1998 | Matthews | |
| 5,815,195 A | 9/1998 | Tam | |
| 5,828,945 A | 10/1998 | Klosterman | |
| 5,857,190 A | 1/1999 | Brown | |
| 5,861,906 A | 1/1999 | Dunn et al. | |
| 5,870,150 A | 2/1999 | Yuen | |
| 5,872,588 A | 2/1999 | Aras et al. | |
| 5,874,985 A | 2/1999 | Matthews | |
| 5,878,141 A | 3/1999 | Daly et al. | |
| 5,883,627 A | 3/1999 | Pleyer | |
| 5,886,746 A | 3/1999 | Yuen et al. | |
| 5,900,905 A | 5/1999 | Shoff et al. | |
| 5,905,522 A | 5/1999 | Lawler | |
| 5,907,323 A * | 5/1999 | Lawler et al. | 725/41 |
| 5,914,746 A | 6/1999 | Matthews et al. | |
| 5,915,026 A | 6/1999 | Mankovitz | |
| 5,917,492 A * | 6/1999 | Bereiter et al. | 715/854 |
| 5,923,362 A | 7/1999 | Klosterman | |
| 5,940,073 A | 8/1999 | Klosterman et al. | |
| 5,940,074 A | 8/1999 | Britt et al. | |
| 5,945,987 A | 8/1999 | Dunn | |
| 5,945,991 A | 8/1999 | Britt et al. | |
| 5,949,954 A | 9/1999 | Young et al. | |
| 5,959,688 A | 9/1999 | Schein et al. | |
| 5,969,748 A | 10/1999 | Casement et al. | |
| 5,970,206 A | 10/1999 | Yuen et al. | |
| 5,974,222 A | 10/1999 | Yuen et al. | |
| 5,987,213 A | 11/1999 | Mankovitz et al. | |
| 5,987,509 A | 11/1999 | Portuesi | |
| 5,988,078 A | 11/1999 | Levine | |
| 5,990,883 A | 11/1999 | Byrne et al. | |
| 5,991,498 A | 11/1999 | Young | |
| 6,002,394 A | 12/1999 | Schein et al. | |
| 6,002,852 A | 12/1999 | Birdwell et al. | |
| 6,005,563 A | 12/1999 | White et al. | |
| 6,008,803 A | 12/1999 | Rowe et al. | |
| 6,008,836 A | 12/1999 | Bruck et al. | |
| 6,014,706 A | 1/2000 | Cannon et al. | |
| 6,016,141 A | 1/2000 | Knudson et al. | |
| 6,025,837 A | 2/2000 | Matthews et al. | |
| 6,028,599 A | 2/2000 | Yuen et al. | |
| 6,028,604 A | 2/2000 | Matthews et al. | |
| 6,034,689 A | 3/2000 | White et al. | |
| 6,049,652 A | 4/2000 | Yuen et al. | |
| 6,052,145 A | 4/2000 | Macrae et al. | |
| 6,055,314 A | 4/2000 | Spies et al. | |
| D424,061 S | 5/2000 | Backs et al. | |
| D424,577 S | 5/2000 | Backs et al. | |
| 6,072,485 A | 6/2000 | Barnes et al. | |
| 6,072,983 A | 6/2000 | Klosterman | |
| 6,075,551 A | 6/2000 | Berezowski et al. | |
| 6,075,575 A | 6/2000 | Schein et al. | |
| 6,078,348 A | 6/2000 | Klosterman et al. | |
| 6,091,882 A | 7/2000 | Yuen et al. | |
| 6,098,086 A | 8/2000 | Krueger et al. | |
| 6,118,492 A | 9/2000 | Milnes et al. | |
| D431,552 S | 10/2000 | Backs et al. | |
| 6,133,909 A | 10/2000 | Schein et al. | |
| 6,133,913 A | 10/2000 | White et al. | |
| 6,137,950 A | 10/2000 | Yuen | |
| 6,141,003 A | 10/2000 | Chor et al. | |
| 6,141,678 A | 10/2000 | Britt | |
| D433,403 S | 11/2000 | Backs et al. | |
| D434,043 S | 11/2000 | Holland et al. | |
| 6,144,378 A | 11/2000 | Lee | |
| 6,144,401 A | 11/2000 | Casement et al. | |
| 6,144,964 A | 11/2000 | Breese et al. | |
| 6,151,059 A | 11/2000 | Schein et al. | |
| 6,154,205 A | 11/2000 | Carroll et al. | |
| D435,561 S | 12/2000 | Pettigrew et al. | |
| 6,167,188 A | 12/2000 | Young et al. | |
| 6,169,541 B1 | 1/2001 | Smith | |
| 6,173,317 B1 | 1/2001 | Chaddha et al. | |
| 6,177,931 B1 | 1/2001 | Alexander et al. | |
| 6,177,945 B1 | 1/2001 | Pleyer | |
| 6,182,072 B1 | 1/2001 | Leak et al. | |
| 6,184,877 B1 | 2/2001 | Dodson et al. | |
| 6,188,401 B1 | 2/2001 | Peyer | |
| 6,215,483 B1 | 4/2001 | Zigmond | |
| 6,215,526 B1 | 4/2001 | Barton et al. | |
| 6,216,265 B1 | 4/2001 | Roop et al. | |
| 6,230,319 B1 | 5/2001 | Britt et al. | |
| 6,233,389 B1 | 5/2001 | Barton et al. | |
| 6,237,022 B1 | 5/2001 | Bruck et al. | |
| 6,239,794 B1 | 5/2001 | Yuen et al. | |
| 6,240,555 B1 | 5/2001 | Shoff et al. | |
| 6,247,176 B1 | 6/2001 | Schein et al. | |
| D445,801 S | 7/2001 | Ma | |
| 6,259,442 B1 | 7/2001 | Britt et al. | |
| 6,262,722 B1 | 7/2001 | Allison et al. | |
| 6,263,501 B1 | 7/2001 | Schein et al. | |
| 6,266,059 B1 | 7/2001 | Matthews et al. | |
| 6,268,856 B1 | 7/2001 | Bruck et al. | |
| 6,292,834 B1 | 9/2001 | Ravi et al. | |
| 6,304,969 B1 | 10/2001 | Wasserman et al. | |
| 6,308,202 B1 | 10/2001 | Cohn et al. | |
| 6,310,886 B1 | 10/2001 | Barton | |
| 6,311,197 B2 | 10/2001 | Mighdoll et al. | |
| 6,311,207 B1 | 10/2001 | Mighdoll et al. | |
| D450,058 S | 11/2001 | Istvan et al. | |
| D450,324 S | 11/2001 | Istvan et al. | |
| D450,711 S | 11/2001 | Istvan et al. | |
| 6,313,851 B1 | 11/2001 | Matthews et al. | |
| 6,317,780 B1 | 11/2001 | Cohn et al. | |
| 6,317,791 B1 | 11/2001 | Cohn et al. | |
| 6,317,885 B1 | 11/2001 | Fries | |
| 6,323,911 B1 | 11/2001 | Schein et al. | |
| 6,327,418 B1 | 12/2001 | Barton | |
| 6,330,719 B1 | 12/2001 | Zigmond et al. | |
| 6,340,997 B1 | 1/2002 | Borseth | |
| 6,341,195 B1 | 1/2002 | Mankovitz et al. | |
| 6,341,374 B2 | 1/2002 | Schein et al. | |
| D453,767 S | 2/2002 | Istvan et al. | |
| D453,768 S | 2/2002 | Wilkins | |

| | | |
|---|---|---|
| D453,936 S | 2/2002 | Istvan et al. |
| 6,344,865 B1 | 2/2002 | Matthews et al. |
| 6,345,264 B1 | 2/2002 | Breese et al. |
| 6,347,398 B1 | 2/2002 | Parthasarathy et al. |
| 6,353,813 B1 | 3/2002 | Breese et al. |
| 6,378,035 B1 | 4/2002 | Parry et al. |
| 6,385,739 B1 | 5/2002 | Barton et al. |
| 6,388,714 B1 | 5/2002 | Schein et al. |
| 6,392,664 B1 | 5/2002 | White et al. |
| 6,396,473 B1 | 5/2002 | Callahan et al. |
| 6,396,546 B1 | 5/2002 | Alten et al. |
| 6,397,388 B1 | 5/2002 | Allen |
| 6,400,407 B1 | 6/2002 | Zigmond et al. |
| 6,412,110 B1 | 6/2002 | Schein et al. |
| 6,412,112 B1 | 6/2002 | Barrett et al. |
| 6,424,342 B1 | 7/2002 | Perlman et al. |
| 6,425,125 B1 | 7/2002 | Fries et al. |
| 6,430,358 B1 | 8/2002 | Yuen et al. |
| 6,430,359 B1 | 8/2002 | Yuen et al. |
| D462,333 S | 9/2002 | Novak |
| D462,339 S | 9/2002 | Allen et al. |
| D463,444 S | 9/2002 | Istvan et al. |
| 6,449,766 B1 | 9/2002 | Fleming |
| 6,453,471 B1 | 9/2002 | Klosterman |
| D463,788 S | 10/2002 | Smith et al. |
| 6,460,180 B1 | 10/2002 | Park et al. |
| 6,460,181 B1 | 10/2002 | Donnelly |
| 6,463,486 B1 | 10/2002 | Parry et al. |
| 6,466,734 B2 | 10/2002 | Yuen et al. |
| 6,469,721 B2 | 10/2002 | Matthews et al. |
| 6,469,753 B1 | 10/2002 | Klosterman et al. |
| 6,473,858 B1 | 10/2002 | Shimomura et al. |
| D465,227 S | 11/2002 | Ro et al. |
| 6,477,705 B1 | 11/2002 | Yuen et al. |
| 6,487,646 B1 | 11/2002 | Adams et al. |
| 6,489,986 B1 | 12/2002 | Allen |
| 6,490,722 B1 | 12/2002 | Barton et al. |
| 6,496,205 B1 | 12/2002 | White et al. |
| 6,498,754 B2 | 12/2002 | Peting et al. |
| 6,498,895 B2 | 12/2002 | Young et al. |
| 6,499,057 B1 | 12/2002 | Portuesi |
| D468,274 S | 1/2003 | Novak |
| D469,104 S | 1/2003 | Istvan et al. |
| D469,443 S | 1/2003 | Wilkins et al. |
| 6,505,232 B1 | 1/2003 | Mighdoll et al. |
| 6,505,348 B1 | 1/2003 | Knowles et al. |
| D470,152 S | 2/2003 | Witus |
| D470,153 S | 2/2003 | Billmaier et al. |
| 6,519,771 B1 | 2/2003 | Zenith |
| 6,526,471 B1 | 2/2003 | Shimomura et al. |
| 6,526,580 B2 | 2/2003 | Shimomura et al. |
| 6,529,233 B1 | 3/2003 | Allen |
| 6,535,253 B2 | 3/2003 | Barton et al. |
| 6,535,920 B1 | 3/2003 | Parry et al. |
| 6,538,701 B1 | 3/2003 | Yuen |
| 6,539,375 B2 | 3/2003 | Kawasaki |
| 6,549,719 B2 | 4/2003 | Mankovitz |
| D474,197 S | 5/2003 | Nguyen |
| 6,559,866 B2 | 5/2003 | Kolde et al. |
| 6,559,894 B2 | 5/2003 | Omura et al. |
| 6,560,678 B1 | 5/2003 | Weissman et al. |
| 6,560,777 B2 | 5/2003 | Blackketter et al. |
| 6,564,379 B1 | 5/2003 | Knudson et al. |
| 6,567,606 B2 | 5/2003 | Milnes et al. |
| 6,570,581 B1 | 5/2003 | Smith |
| 6,571,390 B1 | 5/2003 | Dunn et al. |
| 6,571,392 B1 | 5/2003 | Zigmond et al. |
| D475,718 S | 6/2003 | Witus et al. |
| 6,577,346 B1 | 6/2003 | Perlman |
| D476,994 S | 7/2003 | Simmons et al. |
| 6,588,013 B1 | 7/2003 | Lumley et al. |
| 6,591,421 B1 | 7/2003 | Sullivan |
| D478,090 S | 8/2003 | Nguyen et al. |
| D478,595 S | 8/2003 | Istvan et al. |
| D478,912 S | 8/2003 | Johnson |
| 6,606,652 B1 | 8/2003 | Cohn et al. |
| 6,628,301 B1 | 9/2003 | Acton et al. |
| 6,628,302 B2 | 9/2003 | White et al. |
| D480,733 S | 10/2003 | Hammerquist et al. |
| 6,630,963 B1 | 10/2003 | Billmaier |
| 6,631,523 B1 | 10/2003 | Matthews et al. |
| 6,633,877 B1 | 10/2003 | Saigh et al. |
| 6,637,031 B1 | 10/2003 | Chou |
| 6,637,032 B1 | 10/2003 | Feinleib |
| 6,642,939 B1 | 11/2003 | Vallone et al. |
| 6,643,798 B2 | 11/2003 | Barton et al. |
| 6,651,251 B1 | 11/2003 | Shoff et al. |
| RE38,376 E | 12/2003 | Matthews, III |
| 6,662,218 B2 | 12/2003 | Mighdoll et al. |
| 6,668,133 B2 | 12/2003 | Yuen et al. |
| 6,668,377 B1 | 12/2003 | Dunn |
| 6,678,737 B1 | 1/2004 | Bucher |
| 6,681,396 B1 | 1/2004 | Bates et al. |
| 6,683,630 B1 | 1/2004 | Shoff et al. |
| 6,684,025 B1 | 1/2004 | Perlman |
| D486,834 S | 2/2004 | Allen et al. |
| 6,687,906 B1 | 2/2004 | Yuen et al. |
| 6,694,352 B1 | 2/2004 | Omoigui |
| 6,698,020 B1 | 2/2004 | Zigmond et al. |
| 6,704,058 B2 | 3/2004 | Ranta |
| 6,704,773 B1 | 3/2004 | Cohn et al. |
| 6,704,776 B1 | 3/2004 | Fortune |
| 6,704,813 B2 | 3/2004 | Smirnov et al. |
| 6,704,929 B1 | 3/2004 | Ozer et al. |
| 6,704,931 B1 | 3/2004 | Schaffer et al. |
| 6,708,335 B1 | 3/2004 | Ozer et al. |
| 6,710,815 B1 | 3/2004 | Billmaier et al. |
| 6,721,953 B1 | 4/2004 | Bates et al. |
| 6,724,405 B2 | 4/2004 | Matthews et al. |
| 6,727,935 B1 | 4/2004 | Allen et al. |
| 6,728,713 B1 | 4/2004 | Beach et al. |
| D490,086 S | 5/2004 | Wilkins et al. |
| 6,732,325 B1 | 5/2004 | Tash et al. |
| 6,732,369 B1 * | 5/2004 | Schein et al. .................. 725/39 |
| 6,742,043 B1 | 5/2004 | Moussa et al. |
| 6,742,183 B1 | 5/2004 | Reynolds et al. |
| 6,745,391 B1 | 6/2004 | Macrae et al. |
| 6,748,375 B1 | 6/2004 | Wong et al. |
| 6,748,481 B1 | 6/2004 | Parry et al. |
| 6,754,715 B1 | 6/2004 | Cannon et al. |
| 6,756,997 B1 | 6/2004 | Ward et al. |
| 6,757,837 B1 | 6/2004 | Platt et al. |
| 6,757,906 B1 | 6/2004 | Look et al. |
| 6,760,537 B2 | 7/2004 | Mankovitz |
| 6,762,773 B2 | 7/2004 | Kolde et al. |
| 6,766,523 B2 | 7/2004 | Herley |
| 6,766,524 B1 | 7/2004 | Matheny et al. |
| D494,186 S | 8/2004 | Johnson |
| 6,772,438 B1 | 8/2004 | Blackketter et al. |
| 6,785,901 B1 | 8/2004 | Horiwitz et al. |
| 6,785,902 B1 | 8/2004 | Zigmond et al. |
| D496,665 S | 9/2004 | Billmaier et al. |
| 6,792,195 B2 | 9/2004 | Barton |
| 6,798,457 B2 | 9/2004 | Boyden et al. |
| 6,798,971 B2 | 9/2004 | Potrebic |
| 6,799,326 B2 | 9/2004 | Boylan et al. |
| 6,799,327 B1 | 9/2004 | Reynolds et al. |
| 6,804,824 B1 | 10/2004 | Potrebic et al. |
| 6,804,825 B1 | 10/2004 | White et al. |
| 6,813,643 B2 | 11/2004 | Perlman |
| 6,819,344 B2 | 11/2004 | Robbins |
| 6,820,144 B2 | 11/2004 | Smirnov et al. |
| 6,829,779 B1 | 12/2004 | Perlman |
| 6,842,837 B1 | 1/2005 | Peting et al. |
| 6,847,778 B1 | 1/2005 | Vallone et al. |
| 6,847,779 B2 | 1/2005 | Pietraszak |
| 6,850,691 B1 | 2/2005 | Stam et al. |
| 6,850,693 B2 | 2/2005 | Young et al. |
| 6,851,090 B1 | 2/2005 | Gutta et al. |
| 6,859,799 B1 | 2/2005 | Yuen |
| 6,859,937 B1 | 2/2005 | Narayan et al. |
| 6,861,952 B1 | 3/2005 | Billmaier |
| 6,865,555 B2 | 3/2005 | Novak |
| 6,868,225 B1 | 3/2005 | Brown et al. |
| 6,868,551 B1 | 3/2005 | Lawler et al. |
| 6,886,179 B1 | 4/2005 | Perlman |
| 6,891,553 B1 | 5/2005 | White et al. |
| 6,892,390 B1 | 5/2005 | Lieberman et al. |

| | | | |
|---|---|---|---|
| 6,897,904 B2 | 5/2005 | Potrebic et al. |
| 6,898,762 B2 | 5/2005 | Ellis et al. |
| 6,898,765 B2 | 5/2005 | Matthews et al. |
| 6,901,453 B1 | 5/2005 | Pritchett et al. |
| 6,903,753 B1 | 6/2005 | Gray et al. |
| 6,904,609 B1 | 6/2005 | Pietraszak et al. |
| 6,906,755 B1 | 6/2005 | Lundblad et al. |
| 6,907,576 B2 | 6/2005 | Barbanson et al. |
| 6,915,528 B1 | 7/2005 | McKenna |
| 6,928,652 B1 | 8/2005 | Goldman |
| 6,928,655 B1 | 8/2005 | Omoigui |
| 6,931,657 B1 | 8/2005 | Marsh |
| 6,934,964 B1 | 8/2005 | Schaffer et al. |
| 6,938,077 B2 | 8/2005 | Sanders |
| 6,938,270 B2 | 8/2005 | Blackketter et al. |
| 6,941,575 B2 | 9/2005 | Allen |
| 6,943,843 B2 | 9/2005 | Boyden et al. |
| 6,944,880 B1 | 9/2005 | Allen |
| 6,947,935 B1 | 9/2005 | Horvitz et al. |
| 6,957,260 B1 | 10/2005 | Mighdoll et al. |
| 6,963,903 B2 | 11/2005 | Krueger et al. |
| 6,963,906 B2 | 11/2005 | Portuesi |
| 6,965,415 B2 | 11/2005 | Lundblad et al. |
| 6,965,730 B2 | 11/2005 | Chamberlin et al. |
| 6,966,066 B1 | 11/2005 | Zigmond et al. |
| 6,968,364 B1 | 11/2005 | Wong et al. |
| 6,970,640 B2 | 11/2005 | Green et al. |
| 6,972,787 B1 | 12/2005 | Allen et al. |
| 6,973,050 B2 | 12/2005 | Birdwell et al. |
| 6,973,664 B2 | 12/2005 | Fries |
| 6,973,669 B2 | 12/2005 | Daniels |
| 6,975,713 B1 | 12/2005 | Smith et al. |
| 6,975,717 B1 | 12/2005 | Smith et al. |
| 6,980,638 B1 | 12/2005 | Smith et al. |
| 6,980,993 B2 | 12/2005 | Horvitz et al. |
| 6,981,227 B1 | 12/2005 | Taylor |
| 6,986,062 B2 | 1/2006 | Carpenter |
| 6,990,462 B1 | 1/2006 | Wilcox et al. |
| 6,990,497 B2 | 1/2006 | O'Rourke et al. |
| 6,990,671 B1 | 1/2006 | Evans et al. |
| 6,990,677 B1 | 1/2006 | Pietraszak et al. |
| 6,990,678 B2 | 1/2006 | Zigmond |
| 6,993,532 B1 | 1/2006 | Platt et al. |
| 6,996,390 B2 | 2/2006 | Herley et al. |
| 7,003,795 B2 | 2/2006 | Allen |
| 7,006,613 B2 | 2/2006 | Novak et al. |
| 7,007,244 B2 | 2/2006 | Pankovcin |
| 7,007,294 B1 | 2/2006 | Kurapati |
| D516,573 S | 3/2006 | Gibson |
| D517,059 S | 3/2006 | Newby et al. |
| D517,087 S | 3/2006 | Sands |
| 7,010,265 B2 | 3/2006 | Coffin |
| 7,013,238 B1 | 3/2006 | Weare |
| 7,015,925 B2 | 3/2006 | Ford et al. |
| 7,017,174 B1 | 3/2006 | Sheedy |
| D518,487 S | 4/2006 | MacKenzie et al. |
| D519,122 S | 4/2006 | MacKenzie et al. |
| D519,519 S | 4/2006 | Vong |
| D519,521 S | 4/2006 | Fong |
| 7,023,492 B2 | 4/2006 | Sullivan |
| 7,024,424 B1 | 4/2006 | Platt et al. |
| 7,026,964 B2 | 4/2006 | Baldwin et al. |
| 7,027,101 B1 | 4/2006 | Sloo et al. |
| 7,028,325 B1 | 4/2006 | Rui et al. |
| 7,030,886 B2 | 4/2006 | Ford et al. |
| 7,032,177 B2 | 4/2006 | Novak et al. |
| 7,034,776 B1 | 4/2006 | Love |
| 7,034,927 B1 | 4/2006 | Allen et al. |
| 7,035,355 B2 | 4/2006 | Lais et al. |
| 7,035,526 B2 | 4/2006 | Green |
| 7,036,083 B1 | 4/2006 | Zenith |
| 7,036,090 B1 | 4/2006 | Nguyen |
| 7,036,091 B1 | 4/2006 | Nguyen |
| 7,036,092 B2 | 4/2006 | Sloo et al. |
| 7,036,138 B1 | 4/2006 | Tash |
| 7,038,690 B2 | 5/2006 | Wilt et al. |
| 7,039,935 B2 | 5/2006 | Knudson et al. |
| 7,042,526 B1 | 5/2006 | Borseth |
| 7,043,477 B2 | 5/2006 | Mercer et al. |
| 7,046,805 B2 | 5/2006 | Fitzhardinge et al. |
| 7,050,097 B2 | 5/2006 | Schick et al. |
| 7,050,867 B2 | 5/2006 | Maymudes |
| 7,051,111 B1 | 5/2006 | Scullin |
| 7,051,282 B2 | 5/2006 | Marcjan |
| 7,051,351 B2 | 5/2006 | Goldman et al. |
| 7,055,031 B2 | 5/2006 | Platt |
| 7,055,104 B1 | 5/2006 | Billmaier et al. |
| 7,058,720 B1 | 6/2006 | Majidimehr |
| 7,058,816 B2 | 6/2006 | Valeria |
| 7,058,936 B2 | 6/2006 | Chilimbi et al. |
| 7,065,553 B1 | 6/2006 | Chesley et al. |
| 7,069,284 B2 | 6/2006 | Peting |
| 7,069,576 B1 | 6/2006 | Knudson et al. |
| 7,071,968 B2 | 7/2006 | Novak |
| 7,073,118 B2 | 7/2006 | Greenberg et al. |
| 7,073,193 B2 | 7/2006 | Marsh |
| 7,076,202 B1 | 7/2006 | Billmaier |
| 7,076,734 B2 | 7/2006 | Wolff et al. |
| 7,076,792 B2 | 7/2006 | Zigmond et al. |
| 7,076,794 B2 | 7/2006 | Lieberman et al. |
| 7,080,394 B2 | 7/2006 | Istvan et al. |
| 7,088,910 B2 | 8/2006 | Potrebic et al. |
| 7,093,273 B2 | 8/2006 | Marsh |
| 7,098,868 B2 | 8/2006 | Love et al. |
| 7,099,952 B2 | 8/2006 | Wong et al. |
| 7,103,904 B1 | 9/2006 | Blackketter et al. |
| 7,103,905 B2 | 9/2006 | Novak |
| 7,103,908 B2 | 9/2006 | Tomsen |
| 7,107,532 B1 | 9/2006 | Billmaier et al. |
| 7,107,608 B2 | 9/2006 | Wagner et al. |
| 7,111,320 B1 | 9/2006 | Novak |
| 7,116,894 B1 | 10/2006 | Chatterton |
| 7,117,439 B2 | 10/2006 | Barrett et al. |
| 7,127,127 B2 | 10/2006 | Jojic et al. |
| 7,130,846 B2 | 10/2006 | Danker et al. |
| 7,131,054 B2 | 10/2006 | Greenberg et al. |
| 7,142,230 B2 | 11/2006 | Novak et al. |
| 7,146,632 B2 | 12/2006 | Miller |
| 7,155,675 B2 | 12/2006 | Billmaier et al. |
| 7,155,734 B1 | 12/2006 | Shimomura et al. |
| 7,158,531 B2 | 1/2007 | Barton |
| 7,159,176 B2 | 1/2007 | Billmaier et al. |
| 7,159,177 B2 | 1/2007 | Billmaier et al. |
| 7,161,877 B2 | 1/2007 | Lai et al. |
| 7,161,994 B2 | 1/2007 | Shah et al. |
| 7,162,728 B1 | 1/2007 | Bahn |
| 7,165,264 B1 | 1/2007 | Westrick |
| 7,167,531 B2 | 1/2007 | Greenberg et al. |
| 7,194,511 B2 | 3/2007 | Stettner |
| 7,194,754 B2 | 3/2007 | Tomsen et al. |
| 7,197,234 B1 | 3/2007 | Chatterton |
| 7,197,715 B1 | 3/2007 | Valeria |
| 7,200,321 B2 | 4/2007 | Otala et al. |
| 7,200,859 B1 | 4/2007 | Perlman et al. |
| 7,203,952 B2 | 4/2007 | Broadus |
| 7,216,235 B1 | 5/2007 | Platt |
| 7,228,556 B2 | 6/2007 | Beach et al. |
| 7,236,204 B2 | 6/2007 | Perlman |
| 7,237,252 B2 | 6/2007 | Billmaier |
| 7,243,123 B1 | 7/2007 | Allen et al. |
| 7,245,817 B1 | 7/2007 | Nichols et al. |
| 7,251,255 B1 | 7/2007 | Young |
| 7,251,294 B2 | 7/2007 | Peting |
| 7,263,362 B1 | 8/2007 | Young et al. |
| D551,668 S | 9/2007 | Newby et al. |
| 7,266,832 B2 | 9/2007 | Miller |
| 7,266,835 B2 | 9/2007 | Halbert |
| 7,272,298 B1 | 9/2007 | Lang et al. |
| 7,272,657 B2 | 9/2007 | Allen et al. |
| D552,610 S | 10/2007 | Newby et al. |
| 7,296,284 B1 * | 11/2007 | Price et al. ............ 725/39 |
| 7,302,696 B1 | 11/2007 | Yamamoto |
| 7,310,355 B1 | 12/2007 | Krein et al. |
| 7,313,802 B1 | 12/2007 | Tomsen |
| 7,320,134 B1 | 1/2008 | Tomsen et al. |
| 7,320,137 B1 | 1/2008 | Novak et al. |
| 7,321,716 B1 | 1/2008 | Vallone et al. |
| 7,340,761 B2 | 3/2008 | Billmaier |

| Patent/Publication | Date | Name |
|---|---|---|
| 7,350,157 B1 | 3/2008 | Billmaier et al. |
| 7,360,232 B2 | 4/2008 | Mitchell |
| 7,380,260 B1 | 5/2008 | Billmaier et al. |
| 7,382,838 B2 | 6/2008 | Peting |
| 7,386,129 B2 | 6/2008 | Perlman |
| 7,391,808 B1 | 6/2008 | Farrand |
| 7,409,546 B2 | 8/2008 | Platt |
| 7,428,023 B2 | 9/2008 | Allen et al. |
| 7,434,246 B2 | 10/2008 | Florence |
| 7,440,523 B2 | 10/2008 | Lais et al. |
| 7,463,737 B2 | 12/2008 | Gillon et al. |
| 7,466,640 B2 | 12/2008 | Snow et al. |
| 7,484,234 B1 | 1/2009 | Heaton et al. |
| 7,487,459 B2 | 2/2009 | Billmaier et al. |
| 7,487,529 B1 | 2/2009 | Orlick |
| 7,493,015 B1 | 2/2009 | Van Stam et al. |
| 7,518,629 B2 | 4/2009 | Novak et al. |
| 7,529,465 B2 | 5/2009 | Barton et al. |
| 7,533,403 B1 | 5/2009 | Krein et al. |
| 7,543,325 B2 | 6/2009 | Westbrook et al. |
| 7,546,622 B2 | 6/2009 | Tash |
| 7,558,472 B2 | 7/2009 | Locket et al. |
| 7,573,529 B1 | 8/2009 | Perlman |
| 7,574,656 B2 | 8/2009 | Billmaier et al. |
| 7,590,240 B2 | 9/2009 | Platt et al. |
| 7,594,246 B1 | 9/2009 | Billmaier et al. |
| 7,600,243 B2 * | 10/2009 | Brain et al. .................. 725/44 |
| 7,650,569 B1 | 1/2010 | Allen et al. |
| 7,661,121 B2 | 2/2010 | Smith et al. |
| 7,665,111 B1 | 2/2010 | Barton et al. |
| 7,668,435 B2 | 2/2010 | Lockett et al. |
| 7,671,758 B1 | 3/2010 | Seidel et al. |
| 2001/0029610 A1 | 10/2001 | Corvin et al. |
| 2001/0047298 A1 | 11/2001 | Moore et al. |
| 2001/0047357 A1 * | 11/2001 | Vaithilingam et al. ........ 707/100 |
| 2001/0049820 A1 | 12/2001 | Barton |
| 2001/0054181 A1 | 12/2001 | Corvin |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0146940 A1 * | 8/2003 | Ellis et al. ...................... 345/811 |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0195863 A1 * | 10/2003 | Marsh ............................ 707/1 |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2003/0221192 A1 | 11/2003 | Rappaport et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2006/0156336 A1 | 7/2006 | Knudson et al. |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |
| 2007/0186241 A1 * | 8/2007 | Sugimoto et al. ............... 725/46 |
| 2009/0125843 A1 | 5/2009 | Billmaier et al. |
| 2010/0138868 A1 * | 6/2010 | Sie et al. ...................... 725/46 |

OTHER PUBLICATIONS

TV and Kids: Finally the Right Solution; TiVo Press Release; Mar. 2, 2006; pp. 1-3; Applicant makes no admission that this reference constitutes prior art. http://tivo.com/cms_static/press_78.html.

* cited by examiner

ON-SCREEN PROGRAM GUIDE WITH INTERACTIVE PROGRAMMING RECOMMENDATIONS

BACKGROUND INFORMATION

Customers (a/k/a "subscribers") of modern cable or television (TV) satellite services are familiar with the concept of an on-screen programming guide or an interactive program guide (IPG). These program guides allow a subscriber to display, sort and search TV programming that is playing on the channels available to the subscriber. Typically, when a subscriber accesses the program guide, the programs on at that moment are displayed. The user can generally scroll forward in time to see what is playing later in the day, on the next day, and further ahead in time. A typical program guide allows a subscriber to display programming up to two weeks into the future.

Today's television services provide hundreds of channels to choose programming content from, including movies and pay-per-view events. In the future, it is expected there will be thousands of channels. In order to make selections when faced with such a multitude of options, a subscriber may go to a magazine, newspaper or website to see what TV programs and movies are recommended. Depending upon their preferences, subscribers may rely upon specific sources for recommendations which have established a level of credibility with subscribers, thus these sources become "trusted sources" to a subscriber. However, there presently is not a way to see what their trusted sources have recommended while a subscriber is perusing the on-screen program guide.

BRIEF DESCRIPTION OF THE DRAWING(S)

Figure 6:
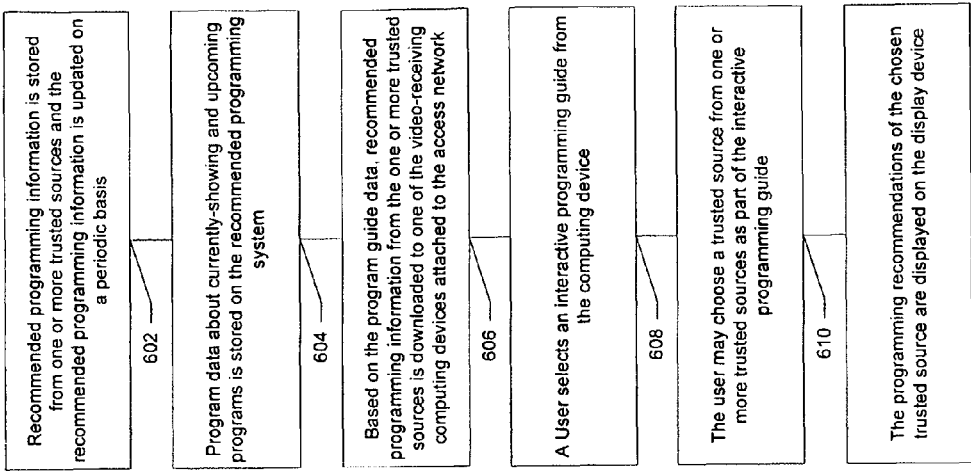
Figure 5:
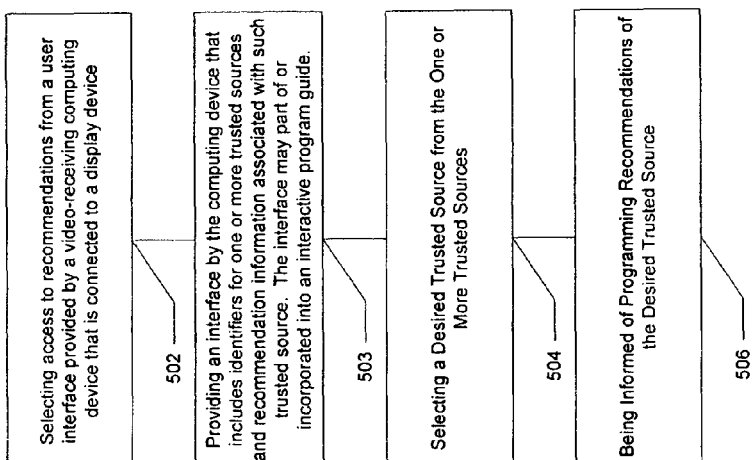

FIG. 5 illustrates an exemplary process for a user to access recommended programming information as such information is integrated into an interactive program guide, in an embodiment of the present invention; and FIG. 6 is another embodiment of an exemplary process for providing a user with recommended television programming from one or more trusted sources while the user is interacting with an on-screen programming guide.

DETAILED DESCRIPTION OF PREFERRED EMBODIMENTS

The preferred embodiments implemented according to the present invention now will be described more fully with reference to the accompanying drawings, in which some, but not all possible embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

The preferred embodiments of the present invention provide systems and methods for a subscriber to make a selection from their on-screen program guide to see what recommendations are made by one or more reviewers. In many cases, the reviewer may be one of the subscriber's trusted sources. The reviewer's recommended programming may be displayed on the television as a simple list, or the recommendations may be incorporated into the program guide by highlighting or otherwise identifying the recommended shows in the program guide. Furthermore, in one embodiment of the invention, reviews of the reviewer's recommendations may be accessed by the subscriber.

As will be appreciated by one skilled in the art, the preferred embodiments may be implemented as a method, a data processing system, or a computer program product. Accordingly, preferred embodiments of the present invention may take the form of an entirely hardware embodiment, an entirely software embodiment, or an embodiment combining software and hardware aspects. Furthermore, implementations of the preferred embodiments may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, or magnetic storage devices.

The preferred embodiments according to the present invention are described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1A:
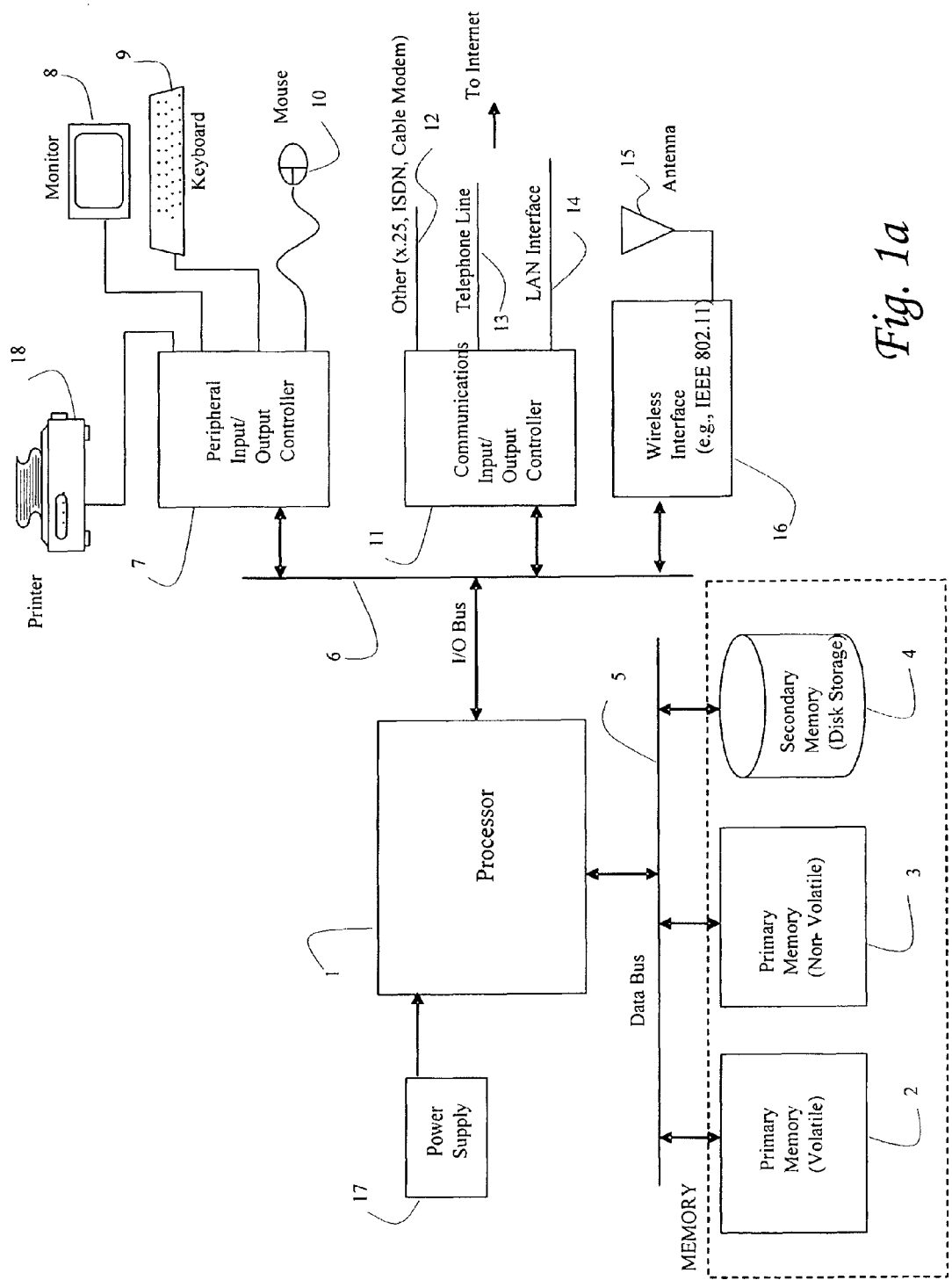
FIG. 1a is an illustration of one embodiment of a computing device that can be used to practice aspects of the present invention.

In the preferred embodiments referenced herein, a "computer" or "computing device" may referenced. Such computer may be, for example, a mainframe, desktop, notebook or laptop, a hand held device such as a data acquisition and storage device, or it may be a processing device embodied within another apparatus such as, for example, a set top box for a television system or a wireless telephone. In some instances the computer may be a "dumb" terminal used to access data or processors over a network. Turning to FIG. 1a, one embodiment of a computing device is illustrated that can be used to practice aspects of the preferred embodiment. In FIG. 1a, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 1B:
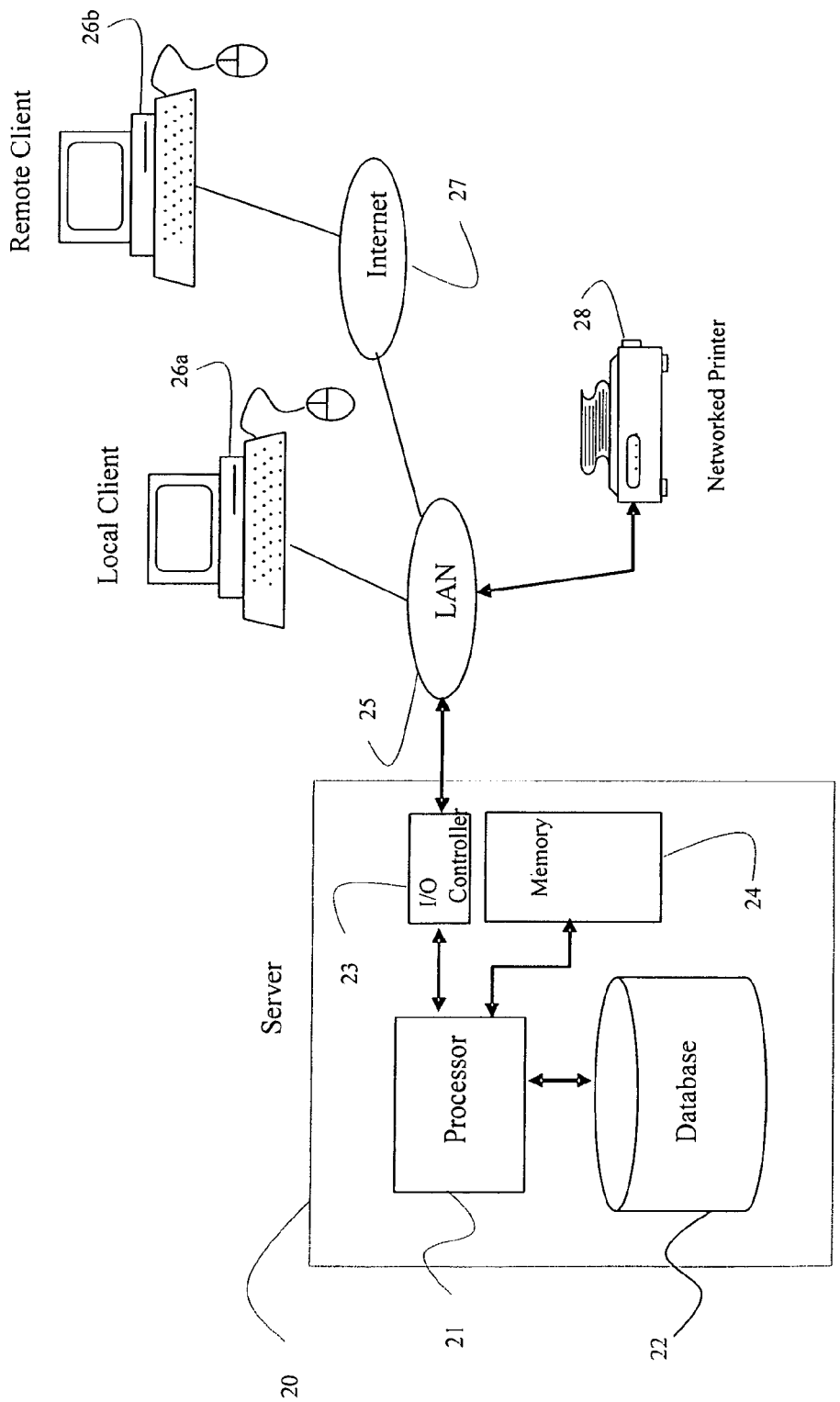
FIG. 1b is an embodiment of a processing system having a distributed communication and processing architecture that may be used to practice aspects of the present invention.

An alternative embodiment of a processing system that may be used is shown in FIG. 1b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the Internet 27, over the LAN 25, and to the server 20.

Those skilled in the art of data networking will realize that many other alternatives and architectures are possible and can be used to practice the preferred embodiments. The embodiments illustrated in FIGS. 1a and 1b can be modified in different ways and be within the scope of the present invention as claimed.

The preferred embodiments provide for trusted sources to store their recommended programming, which are updated on a periodic basis (e.g., daily, weekly, etc.) depending upon the frequency of new episodes of the recommended programming. An interface is provided that allows the trusted sources to submit their recommendations and reviews, though in other embodiments the system may access commercially-available network sites to obtain the trusted sources' recommendations and reviews. When a customer selects a particular trusted source on their computing device user interface, a request is made to a server or other source that stores recommendation information (such as recommendation indications (ratings, codes, etc.) and reviews) or that is able to access recommendation information from other network sites, and the recommendation information is downloaded to the customer's computing device.

Figure 2:
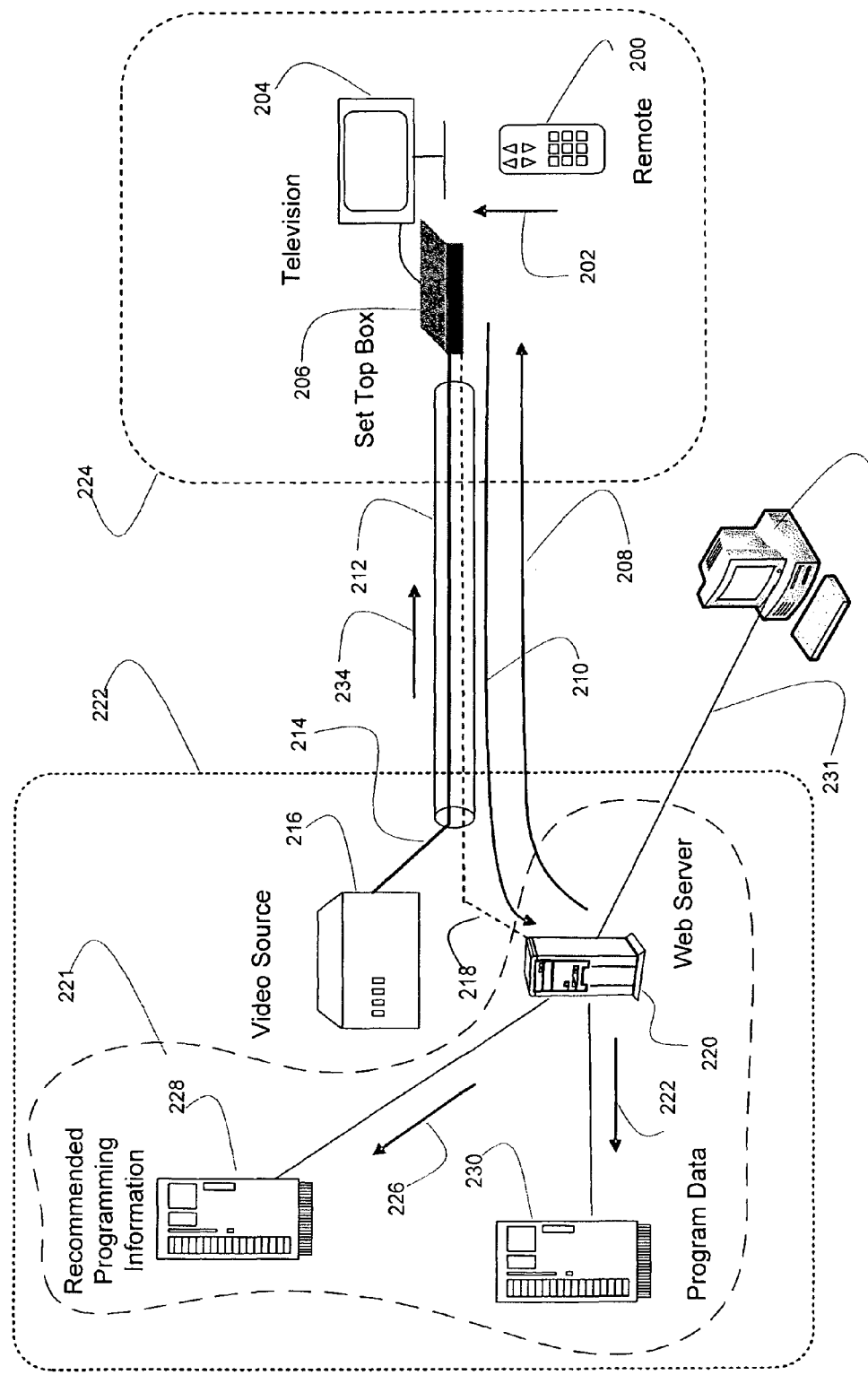
FIG. 2 is an illustration of an exemplary network architecture that may be used to practice one or more embodiments of the present invention.

An embodiment of network architecture that may be associated with an on-screen program guide with programming recommendations is shown in FIG. 2. In FIG. 2, a user, customer or subscriber 224 to a service provider 222 comprises a computing device such as, for example, a set top box 206, a monitor or other display device such as, for example, a television 204, and an input device such as, for example, a remote controller (remote) 200. The remote 200 is used to provide selection input, which is received by the set top box 206. Alternatively, the input could be provided to the set top box 206 in other manners, such as by depressing keys incorporated into the set top box 206, or by other means as known in the art. The set top box 206 includes an output interface facility that provides video signals to television 204 (in known formats). The set top box 206 also includes a network interface facility that is configured to communicate with the service provider over an access network 212. The set top box 206 recognizes multiple types of communications channels from the service provider, such as bidirectional data communications, which may be implemented as an Internet Protocol (IP) channel 218, and multicast/broadcast video communications, which may be implemented as one or more quadrature amplitude modulation (QAM) video channels 214. The service provider 222 may include one or more video source systems 216 (e.g., a headend) as well as other network elements which provide video content to access network 212. Service provider 222 may also include a recommended programming system 221, as further described below Although FIG. 2 illustrates a single video source system 216 and a single subscriber 224, there are typically numerous subscribers and/or network elements within a system. Thus, although the QAM channel 214 is illustrated as point-to-point, it may actually be a broadcast channel in a point-to-multipoint configuration. The IP channel, however, can be viewed as a point-to-point configuration. The other subscribers and network elements are not shown in FIG. 2 for clarity reasons.

The IP channel 218 provides a separate channel for bi-directional communication between the set top box 206 and the service provider. Specifically, the IP channel 218 in this embodiment provides access to the recommended programming system 221, which is able to provide recommendation information to the set top box 206. In one embodiment, the set top box 206 overlays the recommendation window on the video data when presenting the video signal to the television, though in other embodiments the recommendation window is combined with the video signal provided by the service provider. Techniques for overlaying or combining windows are known in the art.

The QAM channel 214 carries video information which originates from video source system 216. Although the QAM channel is illustrated as a single channel, there are typically multiple channels provided over an access network. Typically, additional equipment is required to multiplex and otherwise process a variety of video channels onto the access network (e.g., modulators, amplifiers) and FIG. 2 illustrates only a single video source system for purposes of clarity.

The recommended programming system 221 may be implemented using a recommended programming server 220, a program data store 230, and a recommendation processor 228. The recommended programming server 220 may be implemented to include, for example, a web (HTTP) server or other communications protocol that allows for communications between server 220 and subscribers 224 over access network 212. The recommended programming server 220 has access to program data storage system 230, which stores program data, such as program guide information associated with the various programs available over the access network. For example, the system 230 contains information regarding what programs are currently being provided by the video source 216 and at what times. It is presumed that infrastructure is in place (not shown) for automatically updating the system 230 with the appropriate information. Thus, the server 220 can query (or otherwise obtain) information about which specific programs are being provided on the access network. This may include which programs are currently available on which channels. The server 220 may also have an interface 231 to allow a trusted source 232 to enter recommendation information associated with a particular show. In other embodiments, the recommended programming server may be programmed to search or reach out to specified network sites (e.g., websites) to obtain recommendation information from a trusted source. The server 220 may also be connected to recommendation processor 228, which may be a computer configured to store and process recommendation information from trusted sources. It is to be appreciated that one or more of the recommended programming server 220, the recommendation processor 228 and the program data storage system 230 may be implemented in the same computer (e.g., as separate processes) or separate computers. The recommendation information associated with programming content can be stored on the recommendation processor 228 and integrated into the data communicated over access network 212 so that viewers or potential viewers of the program would be able to see the trusted sources' review. In such a case, the system 228 provides the review data back to the server 220 which transmits it to the set top box 206 and the set top box displays it onto the video data on the television screen.

An embodiment of the typical information flow for processing a request for recommendation information of a trusted source is now described in the context of FIG. 2. A user has made a selection that allows the user to view an on-screen program guide as such are known in the art to determine programming content that is currently available to the user over access network 212 (and may be available in the future). The user may also make a selection to view recommended programming from one or more trusted sources. This may be accomplished by selecting an icon on the on-screen program guide, by making a selection on the set top box separate from the on-screen program guide, or by indicating in some manner by a user action that the user wishes to see the recommendation information for programming content. The user's action, which may be performed by a function key (or some other keypad indication) on the remote 200, indicates a request for recommended programming to the set top box 206. The set top box ascertains the currently available programming content (and possibly programming content that will be available in the future) and sends a message 210 to the recommended programming server 220 over the IP channel 218 indicating the recommended programming request. The request may include various information, such as a set top box identifier and selection criteria (further described below).

The server 220 accesses the program data in system 230 to ascertain the available programs (current and in the immediate future). (Alternatively, the data could have been previously stored in the recommended programming server.) The server 220 provides a transmission 208 to the set top box indicating program guide information for the available and upcoming programming content (alternatively, such information could have been provided to set top box 206 previously and stored, such as on a daily basis). The set top box 206 sends message 210 to the server 220, where message 210 may include selection criteria for the recommendation information (further described below). Server 220 may then send the selection criteria in a request 226 to recommendation processor 228, which retrieves recommendation information— which may include recommendations as well as reviews from various trusted sources—that are associated with the programming content, for example, using the selection criteria. Alternatively, the message 210 could be sent directly from the set top box 206 to the system 228 where recommendations associated with the programming content can be retrieved. Also alternatively, the recommended programming information could be sent directly from the server 220 to the system 228 without receiving message 210, where recommendations associated with the programming content can be retrieved.

This retrieved recommendation information is then provided to the set top box 206 in a transmission 234, where it may be displayed, for example, as an overlay of a video image generated by the video signal. The retrieved recommendation information may include, for example, identifiers of trusted sources providing recommendations, information describing the programming, recommendation indicators (e.g., ratings, codes, etc.), and reviews by the trusted sources. The retrieved recommendation information may be displayed in various ways, depending on the user interface from which the request was made and/or the selection criteria used. For example, information retrieved from a request for recommendation information for all currently available programming may be displayed as a list of identifiers of trusted sources, and the user may select one or more of the trusted sources to see their associated recommendation information. In another example, where the request is associated with a specific program (for example, selected from the program guide), the retrieved recommendation information may be displayed as a list of identifiers of trusted sources and their associated recommendation information for the specific program. When the recommendation information is displayed, the user may be provided an icon to allow the user to tune the set top box 206 to the recommended programming, or (if equipped with the proper recording equipment, such as a digital video recorder), the user may be provided with an option to record the recommended program at the set top box 206 for playback at the user's convenience.

Alternative embodiments to the system described above are possible. For example, in FIG. 2, the trusted source recommendation information was provided via the IP channel to the set top box. In other embodiments, the server 220 may provide the information to the video source system 216 which distributes the information in video form (e.g., as a recommendation "window" displaying the recommendation information) as a separate channel on the access network. (This additional channel is not shown in FIG. 2). The user views the recommendation window by having the set top box select the recommendation channel and displaying the results to the user using, for example, picture-in-picture techniques. This allows the recommendation information to be processed as a separate video feed and displayed using the picture-in-picture capabilities in the television or other display device 204.

The set top box 206 may record the user's request for trusted sources' recommendations, and keep a history of the viewer's actions. This information may be automatically conveyed to the server 220, or retained in the set top box 206 for future downloading to the server 220. The usage information in the server may be periodically 'pulled' or 'pushed' to another computer system that generates periodic bills, in order to properly bill the viewer for such services, if billing is desired. Such information may also be used to determine the preferences of a user so that the recommendations of a trusted source most often selected by a user may be displayed first, or a user may be proactively notified of a preferred trusted source's recommendations without having to request them.

Selection criteria may be any information that may be used to select a subset of recommended programming information to provide to a subscriber. For example, in the preferred system, a user may be able to: select one or more particular programs and view any recommendation information for just the selected programs; select a program type (e.g., a genre, such as sitcoms) and view recommendation information for all programs having the program type; select a video channel and view recommendation information for shows on that channel; select a date range and/or time range and view recommendation information for shows within that range; or any combination of the foregoing. The selection criteria may also give an option to provide recommendation information for currently available programs (or programs to be available within a set time frame, such as a day or a week). The selection criteria may be included in the message from set top box 206 to server 220 requesting recommendation information, or may be default or predefined selection criteria (e.g., recommendations for shows available today over access network) that may be stored or used automatically by server 220.

Figure 3A:
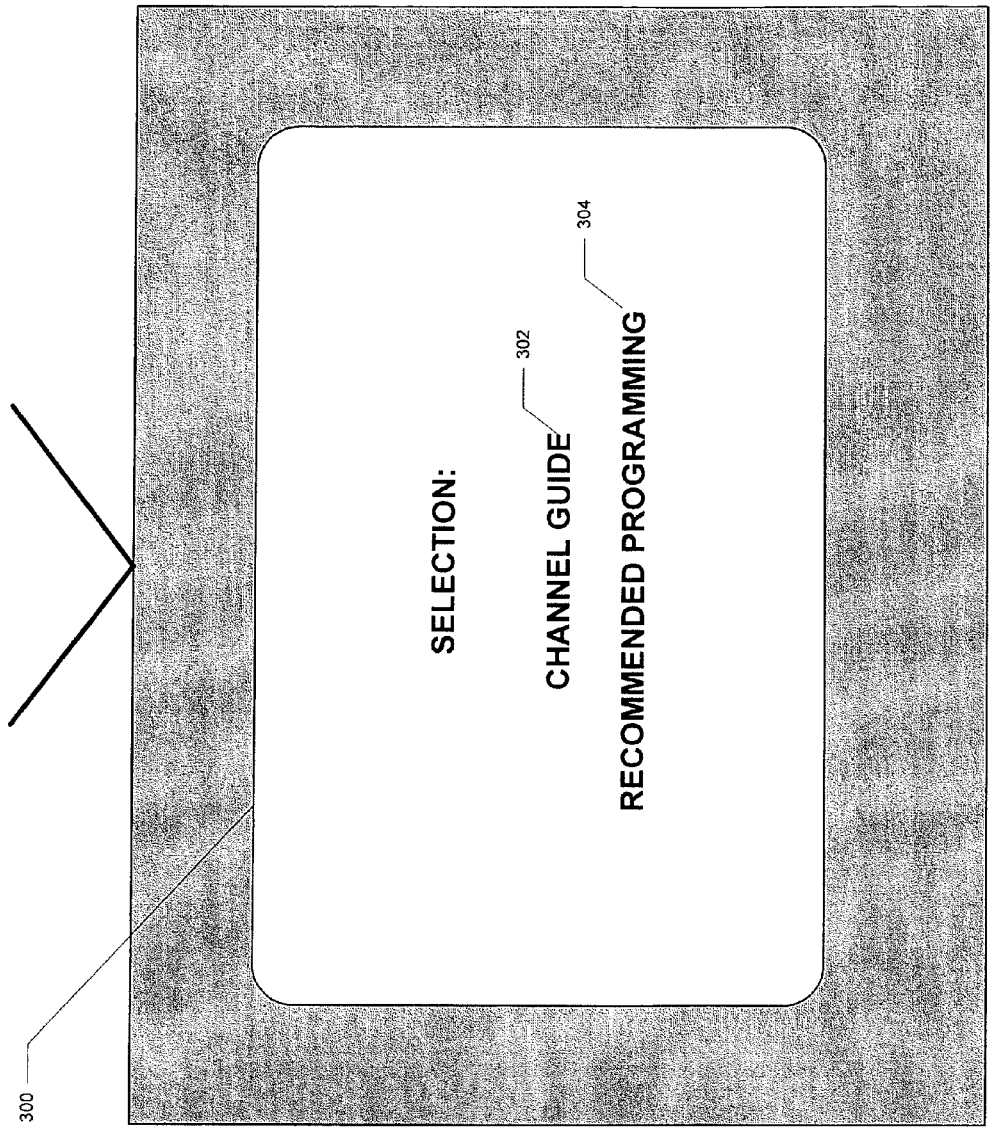
FIGS. 3A-3E are exemplary television or display device screenshots showing the process of obtaining programming recommendation from one or more trusted sources in an embodiment of the present invention.
Figure 3B:
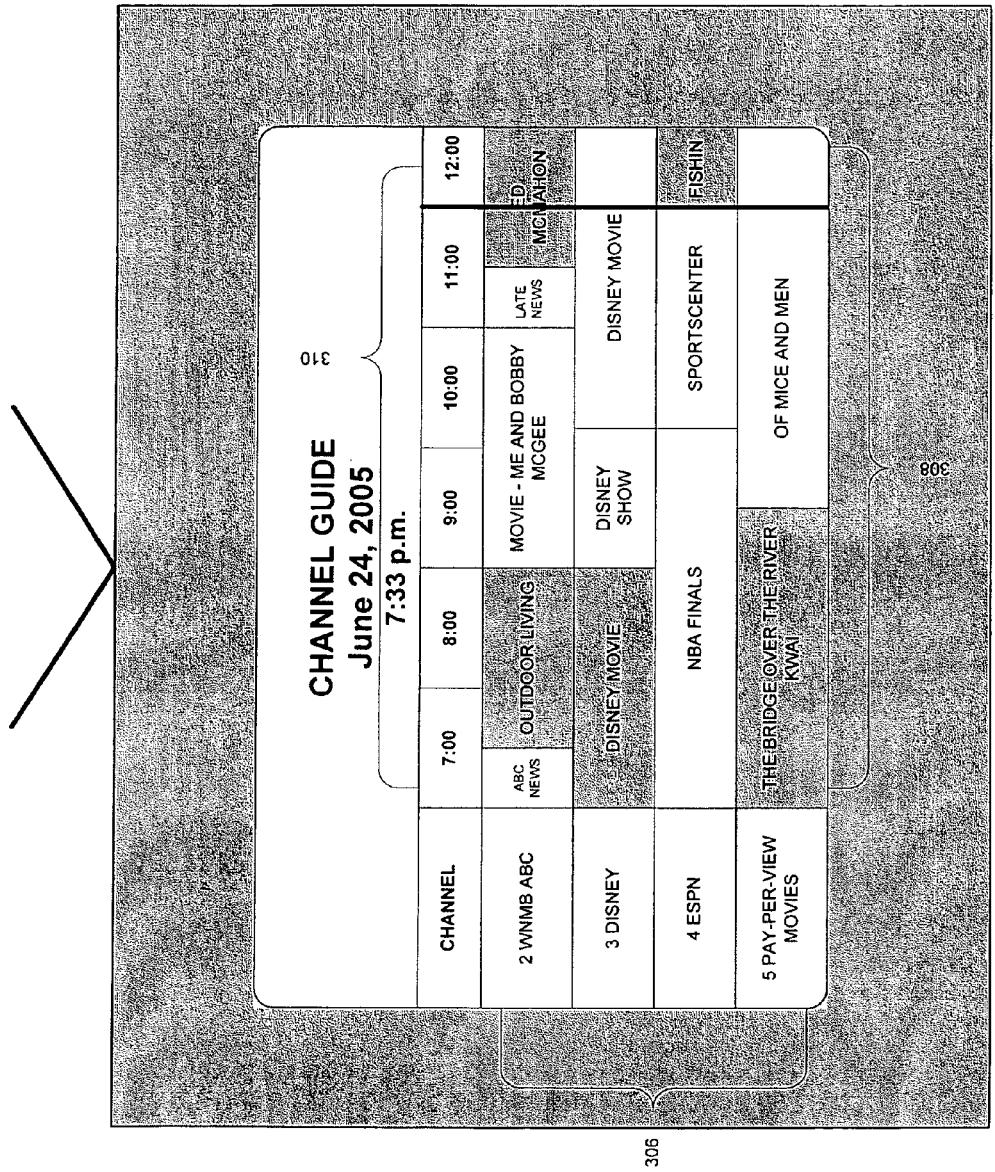

FIGS. 3A-3E are exemplary screenshots of a television or other display device showing the process of obtaining programming recommendations from one or more trusted sources in embodiments of the present invention. In FIG. 3A an action by the user such as, for example, pressing a function key on the remote 200 has caused a selection screen 300 comprised of a selection for a channel guide 302 and a selection for recommended programming 304 to be displayed on the screen 300. The user then chooses the channel guide 302 or the recommended programming 304 (for example, using the remote 200). If the channel guide 302 is selected, then the user is provided a screen similar to the exemplary one shown in FIG. 3B, where the user is provided with information about available channels 306, available programming 308, and the time the programming is shown 310. If the user selects the recommended programming 304 option from FIG. 3A, a message is sent from the set top box 206 to the server 220 (for example, message 210) requesting recommended programming information. The recommended programming server 220 then accesses the system 228 to obtain the recommended programming information using the selection criteria—in this example, the current recommendations for programming available over the access network. The recommended programming information is then transferred from the system 228 to the server 220 and downloaded to the set top box 206, where it is displayed to the user on the user's display device 204 (e.g., a television), using a screen similar to the exemplary one shown in FIG. 3C.

Figure 3C:
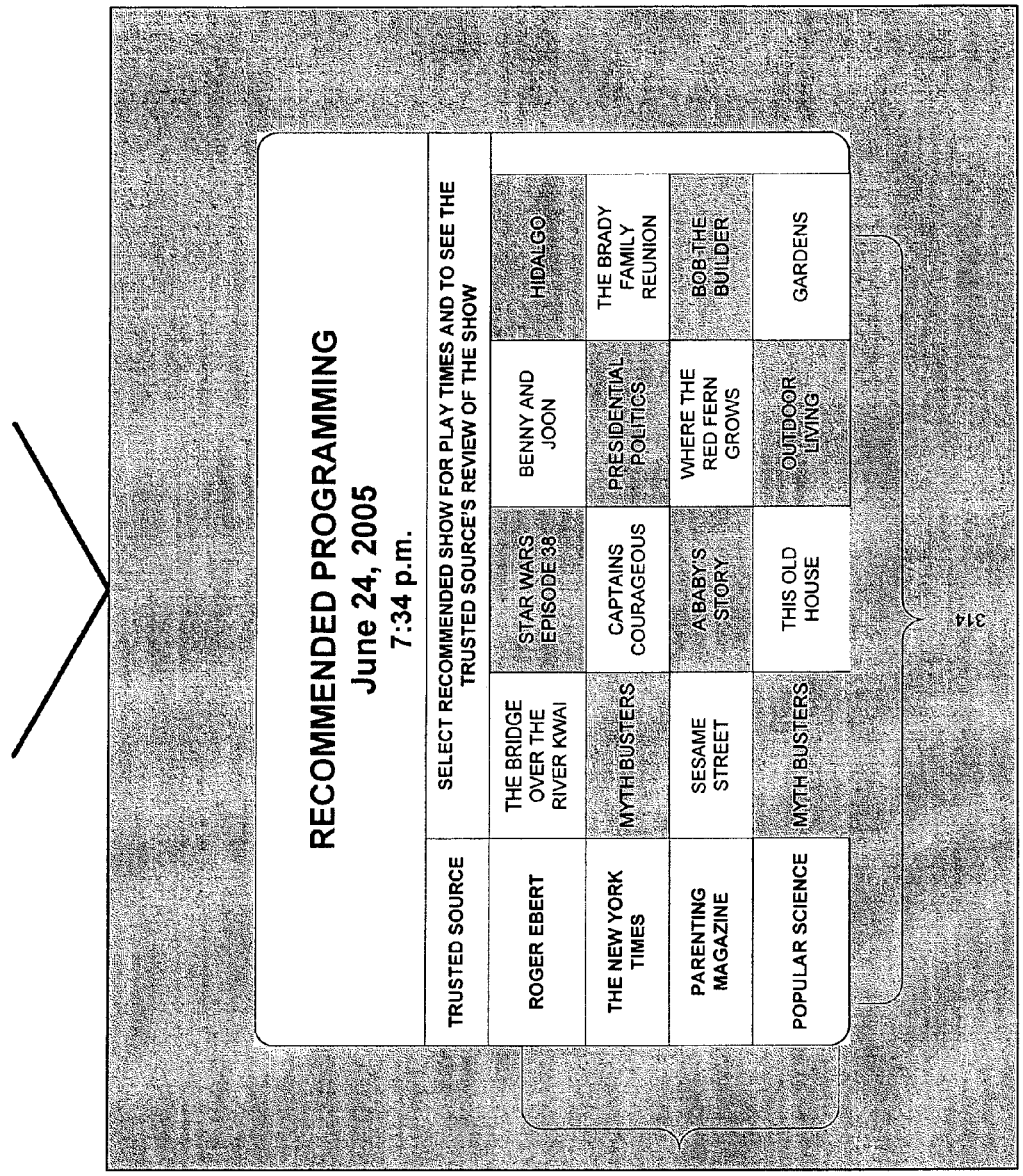
Figure 3D:
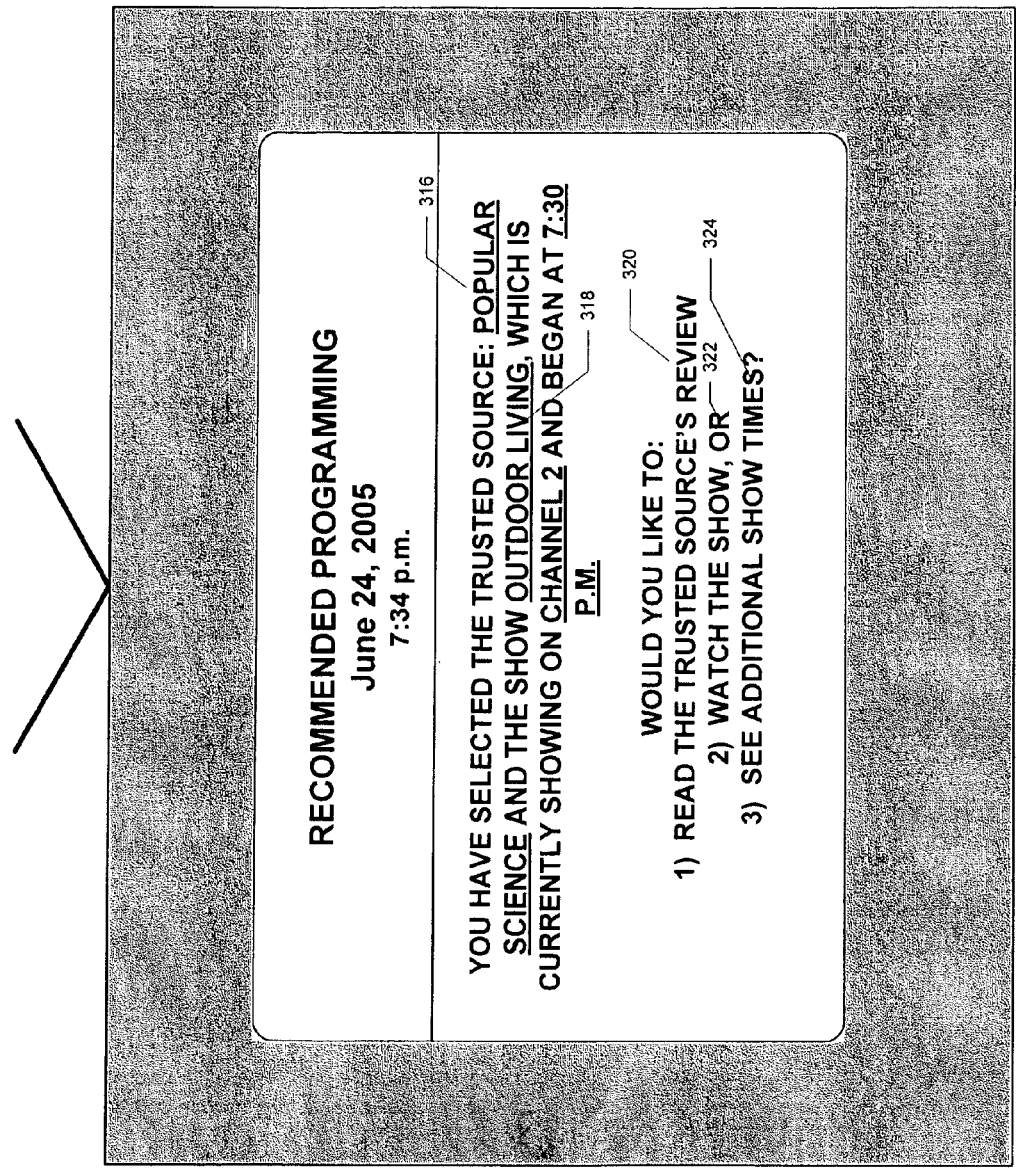
Figure 3E:
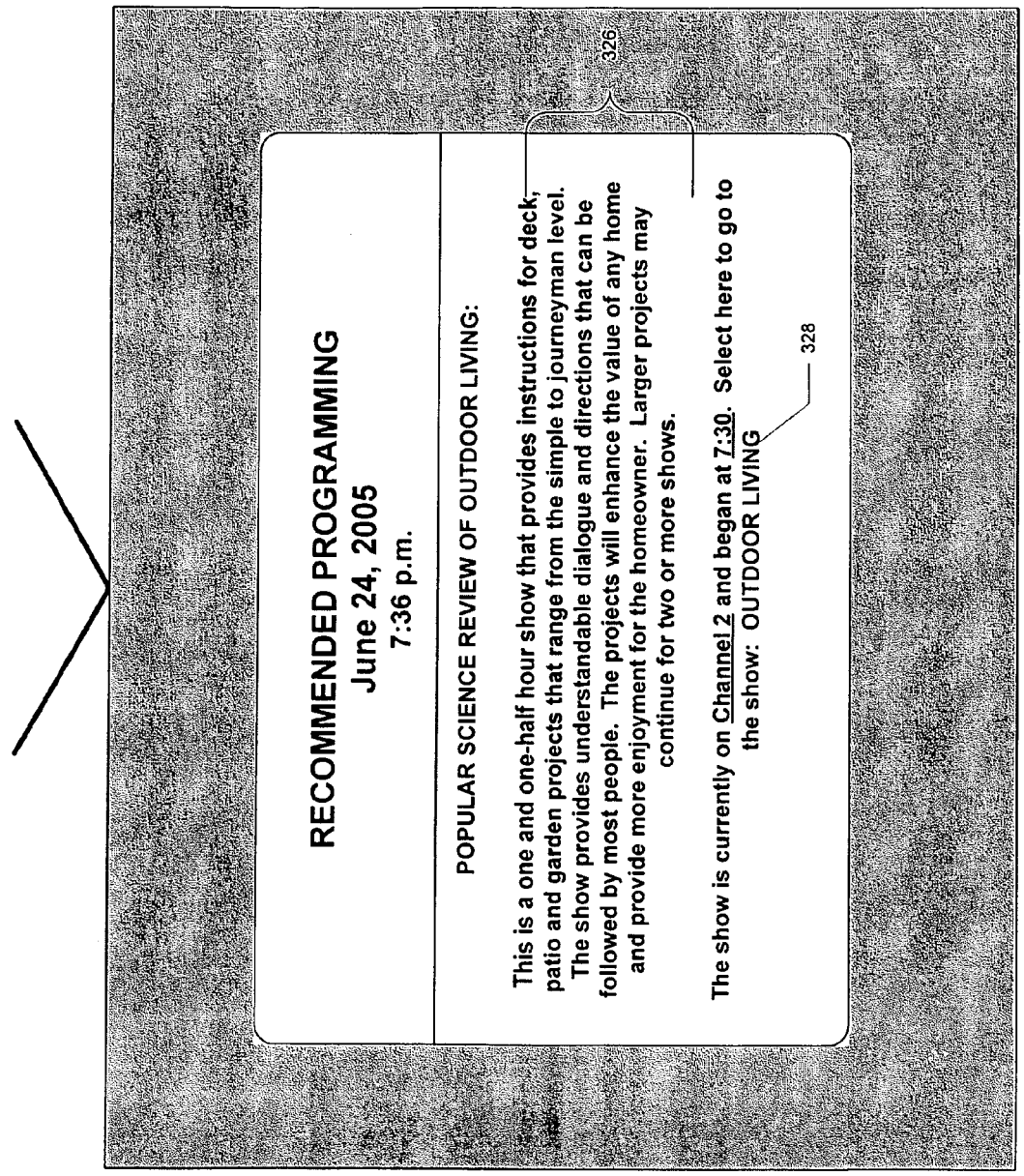

FIG. 3C is an exemplary recommended programming screen, which provides a list of trusted sources 312 and each trusted source's recommended programming 314. The screen may be scrollable or displayed in more than one page so that a larger number of trusted sources may be displayed. In the embodiment of FIG. 3C, the user is able to select a particular trusted source's recommendation, which will cause the screen of FIG. 3D to be displayed. FIG. 3D is an exemplary screen which indicates which trusted source 316 has been selected along with the show 318 being recommended. This embodiment also allows the user to be informed that the chosen show is currently showing on television channel 2 and that it began at 7:30 p.m. The embodiment of FIG. 3D allows the user various options that may be selected using the remote 200, or by some other means of indicating a preference such as function keys on the set top box 206. In this embodiment, the user has the option to read the trusted source's review of the selected show 320, watch the selected show 322, or to see additional show times 324. If, in FIG. 3D, the user selects the option to see the review 320, then the user is taken to a screen as is shown in FIG. 3E. In FIG. 3E, the user is provided with a review 326 of the selected show by the chosen trusted sources. In this embodiment, the user is provided with an option 328 to go to the show for viewing purposes.

The embodiment of FIGS. 2 and 3A-3E is but one example of many different ways that the preferred systems and processes can be implemented. It is to be appreciated that there are several ways that the channel guide may be displayed as well as various ways to make selections that are displayed on the screen and to be made aware of the review. For instance, in one embodiment voice commands rather than a remote may be used to make screen selections and information may be visually displayed on the screen(s) or it may be audible, or combinations thereof. Additionally, although the examples indicate "commercial" trusted sources (e.g., The New York Times), trusted sources may be non-commercial entities or even individuals that provide recommendation information or make such information available—for example, over interface 231, or over access network 212 (such from a subscriber computing device).

Figure 4:
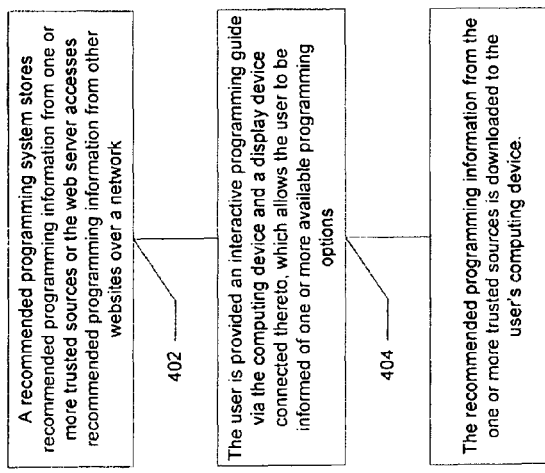
FIG. 4 illustrates an exemplary process for providing a user with recommended television programming from one or more trusted sources while the user is interacting with an on-screen programming guide, in an embodiment of the present invention.

The preferred embodiments of the system described above may be used to provide a user with recommended programming information as a feature of an interactive program guide or other user interface, as further described in the processes described herein. FIG. 4 illustrates a process for providing a user with recommended programming information from one or more trusted sources while the user is interacting with an on-screen programming guide. In Step 402 of FIG. 4, a recommended programming system is provided where recommended programming information of one or more trusted sources is stored, processed and made available for retrieval. The recommended programming information may be entered by the one or more trusted sources through an interface such as a web interface, or the system may obtain the recommendation information from one or more of the trusted sources from other websites. At Step 404, the user is provided an interactive programming guide via the computing device and a display device connected thereto, which allows the user to be informed of one or more available programming options, at a request initiated by the user. At Step 406, the programming recommendation information from the one or more trusted sources is downloaded to the user's computing device, for example, when such information is selectively chosen by the user. In various embodiments, the recommended programming information may be overlaid over or combined with the video image included in the video signal from the computing device to the display device. The display device may be a television, a monitor, etc.

FIG. 5 describes a process for a user to access recommended programming information. At Step 502, a user selects access to recommendations from a user interface provided by a video-receiving computing device (e.g., a set top box) that is connected to a display device (e.g., television). At step 503, an interface is provided by the computing device that includes identifiers for one or more trusted sources and recommendation information associated with such trusted source. The interface may part of or incorporated into an interactive program guide. At Step 504, the user selects a desired trusted source from the one or more trusted sources that are made known to the user. At Step 506, the user is made aware of the recommendation information of the desired trusted source. In one embodiment, the recommendation information may include a review written by the selected trusted source. The user may also be able to make a selection to go directly to a showing of the recommended programming.

FIG. 6 is another embodiment of a process for providing a user with recommended programming information from one or more trusted sources. In Step 602 of FIG. 6, a recommended programming system is provided where recommended programming information of one or more trusted sources is stored, processed and made available to video-receiving computing devices (e.g. set top boxes) attached to the access network and also connected to display devices (e.g. televisions). The recommended programming information includes identifying information about the trusted sources, identifying information of the programming content that a particular trusted source recommends watching, and recommendation indicators (e.g., ratings, codes, etc.). The recommended programming information is updated on a periodic basis to reflect the changing programming content over time. At Step 604, program guide data about current and upcoming program content is stored on the recommended programming system. At Step 606, and based upon the program guide data, recommended programming information from the one or more trusted sources is downloaded to one of the video-receiving computing devices attached to the access network. At Step 608, a user selects to view an interactive programming guide from the computing device. At Step 610, the user selects a trusted source from the one or more trusted sources made available to the user as part of the interactive programming guide. And, at Step 612, the programming recommendations of the selected trusted source are displayed on the display device to the user.

MODIFICATIONS AND ALTERNATIVE EMBODIMENTS

Many modifications and other embodiments will come to mind to one skilled in the art having the benefit of the teachings presented in the foregoing descriptions of the preferred embodiments. For instance, the trusted sources and their recommendations may be provided audibly rather than (or in addition to) visually. Accordingly, it should be understood that the invention is not to be limited to the specific embodiments described herein, but rather to the appended claims, and that modifications and other embodiments are intended to be included within the scope of the appended claims. Although specific terms are employed herein, they are used in an inclusively descriptive sense only and not for purposes of limitation.

That which is claimed:

1. A system comprising:
   a provider system including a source of a plurality of video programs, program guide information associated with the plurality of video programs,
   a recommended programming information system storing recommended programming information associated with the plurality of video programs, the provider system configured to transmit the plurality of video programs and the program guide information over an access network connected to the provider system; and
   a subscriber computing device connected to the provider system via the access network, wherein said computing device is configured to
   receive at least one video program of the plurality of video programs and the program guide information over the access network,
   receive the recommended programming information over the access network, the recommended programming information including a plurality of trusted sources and a plurality of recommendation indicators, each recommendation indicator being associated with at least one of the plurality of trusted sources and pertaining to at least one of the plurality of video programs,
   maintain a history of subscriber actions, the history including subscriber requests for recommended programming information from at least one of the plurality of trusted sources, and
   provide a signal to a display device that includes the program guide information, wherein the displayed program guide information includes a list of at least two of the plurality of trusted sources, and for each listed trusted source the displayed program guide further includes a list of video programs indicated as being recommended by the listed trusted source based on at least one of the plurality of recommendation indicators, the list of at least two of the plurality of trusted sources being arranged according to the history of subscriber actions.

2. The system of claim 1, wherein said subscriber computing device is a set top box.

3. The system of claim 1, wherein the recommended programming information system includes a server, wherein said server is connected to the subscriber computing device over the access network and configured to receive the recommended programming information and provide the recommended programming information over the access network to the subscriber computing device upon request.

4. The system of claim 1, wherein said subscriber computing device is further configured to receive the at least one video program via at least one video channel over the access network, and to receive the recommended programming information via one of the at least one video channel and an internet protocol (IP) channel over the access network.

5. The system of claim 1, wherein the subscriber computing device is further configured to send a request to the recommended programming information system for the recommended programming information, and the recommended programming information system is further configured to transmit the recommended programming information in response to the request.

6. The system of claim 5, wherein the request includes selection criteria, the selection criteria including an indication of current recommendations.

7. The system of claim 1, wherein said recommended programming information is associated with at least one trusted source, and the recommended programming information includes an identifier for each one of the at least one trusted source and identification information for at least some of the plurality of video programs.

8. The system of claim 1, wherein the recommended programming information includes, for each video program of the plurality of video programs, at least one of: an identifier of a trusted source associated with recommendation information for the video program, identification information associated with the video program, recommendation indicators and a review of the video program provided by said trusted source.

9. A system, comprising:
a network interface to an access network, the network interface configured to receive at least one video program of a plurality of video programs available over the access network and receive program guide information associated with the plurality of video programs over the access network,
an output interface to a display device, the network interface configured to provide a video signal to the display device;
a processing system connected to the network interface and the output interface, the processing system configured to
receive and store the program guide information,
receive a first request for recommended programming information associated with the plurality of video programs, the recommended programming information including a plurality of trusted sources and a plurality of recommendation indicators, each recommendation indicator being associated with at least one of the plurality of trusted sources and pertaining to at least one of the plurality of video programs,
provide a second request indicating the requested recommended programming information to the network interface for transmission over the access network,
receive the requested recommended programming information from the network interface in response to the second request,
maintain a history of subscriber actions, the history including subscriber requests for recommended programming information from at least one of the plurality of trusted sources, and
provide the program guide information to the output interface for inclusion in the video signal to said display device, wherein the displayed program guide information includes a list of at least two of the plurality of trusted sources, and for each listed trusted source further including a list of video programs that the listed trusted source recommends based on at least one of the plurality of recommendation indicators, the list of at least two of the plurality of trusted sources being arranged according to the history of subscriber actions.

10. The system of claim 9, wherein the network interface, output interface and processing system are within a set top box.

11. The system of claim 9, wherein said network interface is configured to
receive the at least one video program via at least one video channel over the access network, and to receive the recommended programming information via one of the at least one video channel and an internet protocol (IP) channel over the access network.

12. The system of claim 9, wherein the second request includes at least one of an identifier of a trusted source, an identifier of a video program, and a time period.

13. The system of claim 9, wherein the output interface is configured to
provide the recommended programming information to the display device by overlaying the recommended programming information over an image included in the video signal to the display device.

14. The system of claim 9, wherein said recommended programming information includes, for each video program of the plurality of video programs, at least one of: an identifier of a trusted source associated with recommendation information for the video program, identification information associated with the video program, recommendation indicators and a review of the video program provided by said trusted source.

15. A method comprising:
providing a plurality of video programs for transmission over an access network;
receiving recommended programming information associated with a subset of the plurality of video programs, the recommended programming information including a plurality of trusted sources and a plurality of recommendation indicators, each recommendation indicator being associated with at least one of the plurality of trusted sources and pertaining to at least one of the plurality of video programs;
providing program guide information over the access network, the program guide information associated with the plurality of video programs;
receiving an indication to provide a selected amount of the recommended programming information over the access network to a computing device;
determining the selected amount of the recommended programming information;
providing the selected amount of the recommended programming information over the access network to the computing device;
maintaining a history of subscriber actions, the history including subscriber requests for the recommended programming information from at least one of the plurality of trusted sources;
providing the program guide information to a display device, wherein the displayed program guide information includes a list of at least two of the plurality of trusted sources, and for each listed trusted source further including a list of video programs that the listed trusted source recommends based on at least one of the plurality of recommendation indicators; and
arranging the list of at least two of the plurality of trusted sources according to the history of subscriber actions.

16. The method of claim 15, wherein providing the selected amount of recommended programming information includes transmitting the recommended programming information via an Internet Protocol (IP) channel over the access network.

17. The method of claim 15, wherein the indication to provide the selected amount of the recommended programming information is received over the access network from the computing device, the indication including selection criteria, the selection criteria including an indication of current recommendations.

18. The method of claim 15, wherein determining the selected amount of recommended programming information includes receiving selection criteria, and producing the selected amount of recommended programming information from the received recommended programming information using the selection criteria.

19. A method comprising:
providing a user interface containing program guide information for a plurality of video programs over an access network to a display device for viewing by a user;
listing a plurality of trusted sources in the user interface, and for each listed trusted source further including a list of video programs that the listed trusted source recommends;
maintaining a history of subscriber actions, the history including subscriber requests for the recommended programming information from at least one of the plurality of trusted sources;
arranging the listing of the plurality of trusted sources in the user interface according to the history of subscriber actions;
receiving a first request for recommended programming information, the first request including an indication of a video program recommended by at least one of the plurality of trusted sources;
transmitting a second request over the access network, the second request indicating the requested recommended programming information; and
providing the recommended programming information to the display device.

20. The method of claim 19, wherein providing the recommended programming information to the display device includes identifying at least some of the plurality of video programs by title.

21. The method of claim 20, wherein the requested recommended programming information includes a review of a recommended video program by the selected trusted source.

22. The method of claim 19, wherein providing the recommended programming information to the display device comprises overlaying the recommended programming information upon an image of the interactive programming guide generated by a video signal from the set top box to the display device.

23. The system of claim 9, wherein at least one of the first and second requests includes selection criteria, the selection criteria including an indication of current recommendations.

24. The method of claim 19, wherein at least one of the first and second requests includes selection criteria, the selection criteria including an indication of current recommendations.

25. The system of claim 1, wherein said subscriber computing device is further configured to:
receive a selection of a recommended video program from said list of video programs; and
provide a signal to a display device that includes an indication of said recommended video program, an indication of which trusted source is associated with said recommended video program, and an option to read a review by said indicated trusted source of said recommended video program.

26. The method of claim 19, further comprising upon selection of a recommended video program from the list of video programs, displaying in the user interface an indication of the recommended video program, an indication of which trusted source is associated with the recommended video program, and an option to read a review by said indicated trusted source of the recommended video program.

27. The method of claim 26, further comprising displaying the review of the recommended video program upon selection of the option to read the review.

28. The system of claim 1, wherein the list of at least two of the plurality of trusted sources is represented as a list of channels in the program guide, and the list of video programs indicated as being recommended by the listed trusted source is represented as channel programming in the program guide.

29. The system of claim 1, wherein said subscriber computing device is further configured to convey the history of subscriber actions to the provider system, and the provider system is further configured to bill the subscriber according to the history of subscriber actions.

30. The system of claim 1, wherein said list of at least two of the plurality of trusted sources is arranged such that recommendations of a trusted source most often selected by a subscriber are displayed first.

31. The system of claim 1, wherein said subscriber computing device is further configured to:
determine a preference of the subscriber for a preferred trusted source according to the history of subscriber actions; and
proactively notify the subscriber of a recommendation of the preferred trusted source without the subscriber having to request the notification.

32. The system of claim 1, wherein the provider system further comprises an interface configured to allow one of the plurality of trusted sources to enter recommendation programming information.

33. The system of claim 1, wherein the provider system is further configured to access commercially-available network sites to obtain recommendation programming information from one of the plurality of trusted sources.

* * * * *